Sept. 27, 1949. G. REISINGER 2,483,152
BORING TOOL HOLDER
Filed Nov. 18, 1947 2 Sheets-Sheet 1

INVENTOR.
GEORGE REISINGER
BY
ATTORNEY

Sept. 27, 1949.   G. REISINGER   2,483,152
BORING TOOL HOLDER
Filed Nov. 18, 1947   2 Sheets-Sheet 2
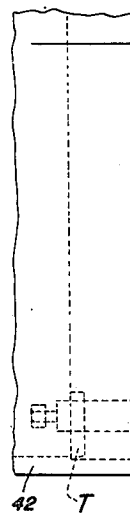
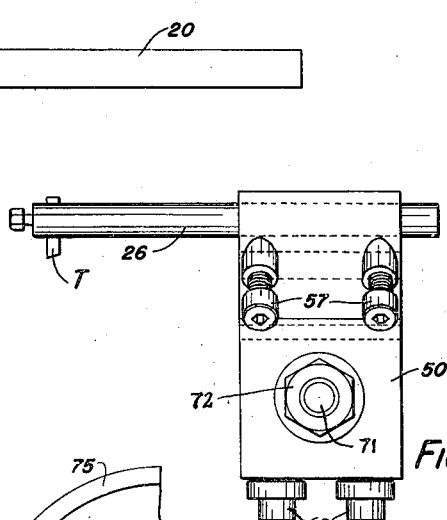
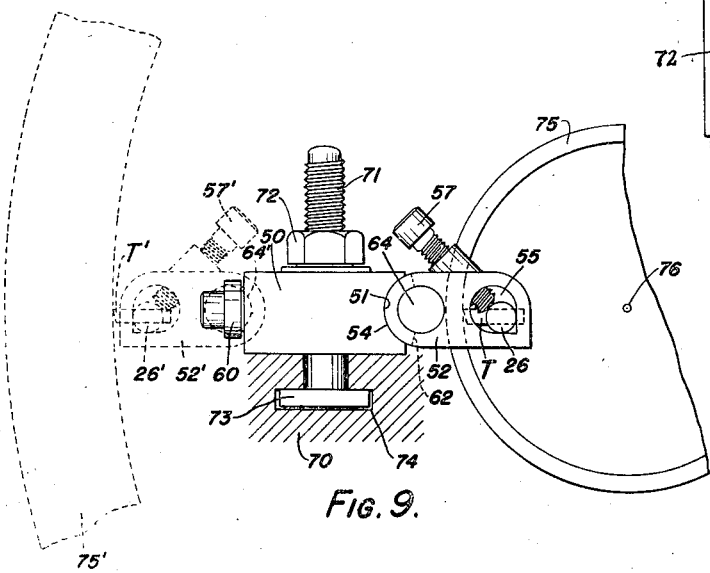
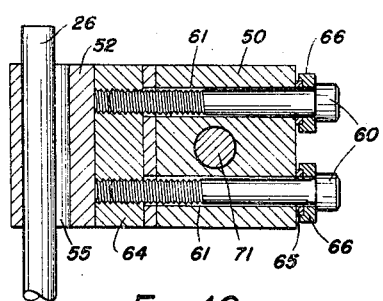
INVENTOR.
GEORGE REISINGER
BY
ATTORNEY Patented Sept. 27, 1949

2,483,152

UNITED STATES PATENT OFFICE 2,483,152

BORING TOOL HOLDER

George Reisinger, Irondequoit, N. Y.

Application November 18, 1947, Serial No. 786,570

10 Claims. (Cl. 29—98)

The present invention relates to tool holders and more particularly to tool holders such as are used on lathes for supporting boring bars.

In the ordinary lathe, the tool holder is adjustable rectilinearly, and for placing the cutting edge of the tool on center, that is, in the horizontal plane containing the axis of the work, this rectilinear adjustment is in the vertical direction.

The present invention has for its principal objects the provision of a tool holder, particularly for boring bars, through use of which positioning of the tool on center can be effected with greater ease and greater accuracy and which can nevertheless be held securely in any adjusted position.

Another object of the invention is to provide a tool holder which will have a greater range of adjustment than the conventional tool holder and through use of which a boring tool can be adjusted to cut bores of an extremely wide range of diameters.

A further object of the invention is to provide a tool holder, particularly for boring tools, in which vertical adjustment of the tool up or down can be effected simply and accurately by angular adjustment of the holder.

Another object of the invention is to provide a tool holder, particularly for boring tools, which is so constructed that upon loosening of the bolt or bolts, which serve to secure the tool in any adjusted position, the tool can easily be adjusted manually but will still be held under sufficient tension to remain in any position to which it may be moved.

Still further objects of the invention are to provide a tool holder, for lathes, particularly for boring bars, which will be simple in construction and compact.

Other objects of the invention will be apparent hereinafter from the specification and from the recital of the appended claims.

In the drawings:

Fig. 7 is a corresponding view showing the tool holder adjusted to another position so as to permit the tool to bore a hole of much larger diameter;

Fig. 8 is a plan view of a tool holder built according to a modification of the invention;

Fig. 9 is a side elevation of this tool holder, also illustrating diagrammatically two different positions to which this tool holder may be adjusted; and Fig. 10 is a longitudinal sectional view through this tool holder.

Figure 1:
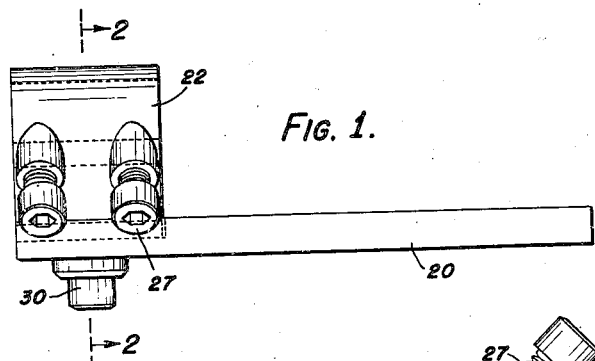
Fig. 1 is a plan view of a tool holder made according to one embodiment of this invention.
Figure 2:
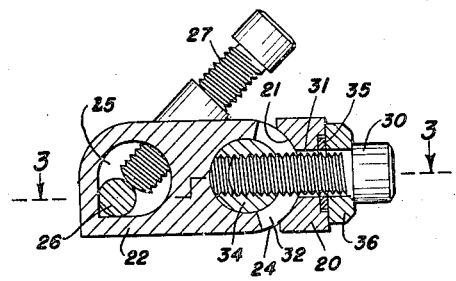
Fig. 2 is a section through this holder on the line 2—2 of Fig. 1.

Referring now to the drawings and first to Figs. 1 to 7 inclusive, 20 denotes a supporting bar which may be secured at one end in the conventional tool post of a lathe or to one of the spindles thereof. The free end of this bar is provided on one side with a recess or groove 21 which is of concave circular arcuate shape. Mounted upon the bar 20 for angular adjustment thereon is a tool block 22. In the embodiment of the invention illustrated, this block has at one side an arcuately curved convex bearing surface 24 of complementary shape to the recess 21 and adapted to fit into the recess 21.

The block 22 has a hole 25 in it adjacent its opposite side in which any conventional form of boring bar 26 may be secured by clamping screws 27 which thread into the block and engage the bar. A suitable boring tool T is carried by the boring bar 26.

The block 22 is secured to the support 20 by a bolt 30. This bolt is adapted to pass through a hole 31 in the bar 20 and an arcuate slot 32 in the block 22 and to thread at right angles into a cylindrical pin 34 which fits snugly in a hole in the block 22. The pin 34 extends parallel to the hole 25 and to the lengthwise direction of bearing surface 24. The bolt 30 serves to secure the pin 34 against movement relative to the block 22. Hence the pin, which is coaxial with surfaces 21 and 24, serves as a pivot on which the block 22 may be adjusted angularly to move the boring bar 26 up or down.

The support 20 is recessed on the side opposite the recess 21 to receive a conventional spring washer 35 that surrounds the bolt 30. This washer engages against the inside face of a washer 36 which is interposed between the support and the head of the bolt.

Figure 4:
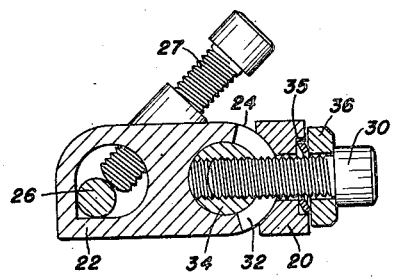
Fig. 4 is a sectional view similar to Fig. 2 but showing the securing bolt loosened slightly to permit angular adjustment of the tool.
Figure 3:
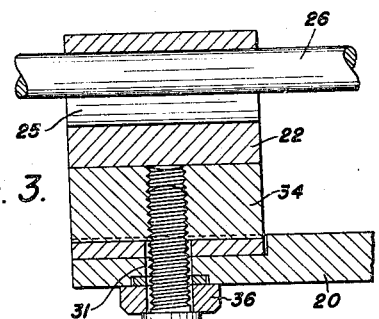
Fig. 3 is a fragmentary sectional view of the holder taken on the line 3—3 of Fig. 2.
Figure 5:
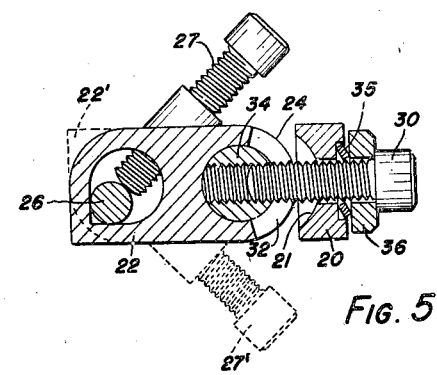
Fig. 5 is a sectional view similar to Figs. 2 and 4 but showing the holding bolt moved to fully released position to permit inversion of the tool.

When the bolt 30 is loosened slightly, as shown in Fig. 4, the block 22 may be manually adjusted angularly on the support 20 to adjust the boring bar 26 and the boring tool T carried thereby vertically. The spring washer 35 then serves to apply sufficient friction pressure to hold the block 22 in any position to which it is moved. After the adjustment is completed, the bolt 30 can be tightened up again to cause the pin 34 to pull the block 22 firmly into the recess 21 of the bar and clamp the block rigidly in any adjusted position. The arcuate slot 32 in the block permits of this adjustment being made and allows of a considerable range of vertical adjustment of the tool. When the bolt 30 is loosened sufficiently, moreover, as shown in Fig. 5, the whole block 22 can be swung through an angle of 180° to invert the block on the support. By then inverting the supporting bar 20 in the tool post of the lathe, the boring tool T can be adjusted to a much different radial position from that which it originally occupied. With the tool holder of the present invention, then, a wide range in diameters of bores can be cut with the same tool without requiring any adjustment of the cross slide of the lathe.

In the construction shown, the boring bar 26 is at all times parallel to the bed of the lathe, thereby eliminating any possibility of tilt of the boring tool, and insuring at all times cutting of a perfect and true bore in the work, without requiring that the tool T be adjusted in the boring bar.

Fig. 5 shows the bolt 30 loosened up sufficiently to permit the block 22 and bolt 30 to be swung through the angle of 180°. The inverted position of the block is shown in dotted lines and indicated at 22', 27' denoting the inverted position of the holding screws.

Figure 6:
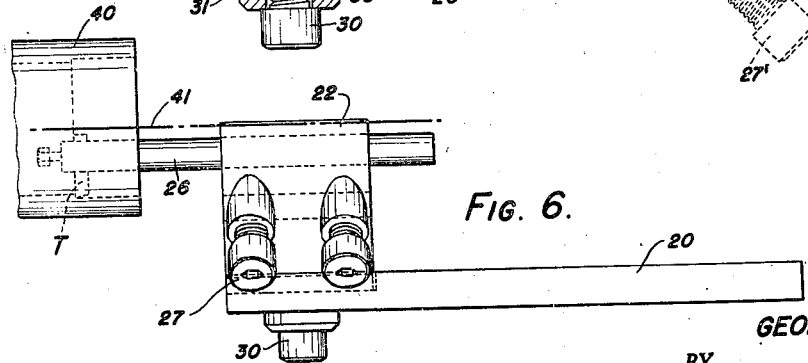
Fig. 6 is a plan view showing the tool holder in one position of adjustment with a boring tool mounted therein and operating upon a work piece.

Figs. 6 and 7 illustrate the range of work that may be handled simply by inversion of the block 22 and support 20. In Fig. 6, 40 designates a work piece which is to be bored, and 41 is the axis of the work spindle of the lathe. Here the boring bar 26 is between the support 20 and the work axis 41. In Fig. 7, the block 22 has been inverted on the support 20 and the support 20 itself has been inverted, in the tool post of the lathe (not shown). In its new position, the boring bar 26 is further away from the axis 41 of the work than the support 20, thus permitting the boring tool T to bore a hole of much larger diameter in a work piece 42 without any adjustment of the cross slide of the lathe. Further range is, of course, possible by adjustment of the cross slide.

A modified form of tool holder made according to this invention is illustrated in Figs. 8 to 10 inclusive. This embodiment of the invention is for larger work where the cuts are heavier.

In this embodiment, there is a supporting block 50 provided instead of the supporting bar 20. This supporting block has a concave circular arcuate recess 51 in one side of it, similar to the recess 21 of bar 20. Mounted upon the block 50 for angular adjustment thereon is a block 52. This block has a convex circular arcuate bearing surface 54 at one side complementary to recess 51 and adapted to seat therein. The block 52, like the block 22, has a hole 55 therein in which may be mounted a boring bar 26 of conventional construction to which is secured a standard boring tool T.

The block 52 is adapted to be secured in any adjusted position by a pair of bolts 60 which pass through holes 61 in the block 50 and arcuate slots 62 in the block 52 and which thread into a pin 64. The pin 64 fits snugly into a hole in the block 52 parallel to the hole 55 and parallel to the lengthwise direction of the bearing surface 54. The pin may serve, therefore, as a pivot for block 52.

Interposed between the heads of the bolts 60 and the block 50 are washers 66 which are recessed on their inside faces to receive spring washers 65. These spring washers serve to hold the block 52 frictionally when the bolts 60 are loosened slightly to permit angular adjustment of the block 52. When the bolts are tightened again, the block 52 is held between block 50 and pin 64. The angular adjustment of block 52 in block 50 permits of adjusting the vertical position of the boring tool T so that its cutting point may lie in the horizontal plane containing the axis of the work.

The block 50 is adapted to be secured to the lathe, as, for instance, to the cross slide 70 thereof as by means of a T-bolt 71 and a nut 72 that threads thereon. The T-bolt 71 passes through the block 50 between the securing bolts 60 and its head 73 engages in the T-slot 74 of the tool post. While the slots 62 in the block 52 are the same size as the slots 32 in block 22, due to the use of two bolts 60 it is impossible to invert the block 52 on block 50 simply by loosening these bolts. By loosening the nut 72, however, the block 50 can be rotated through 180° about the axis of bolts 71. This enables the boring tool to be adjusted to cut a wide range of bore diameters.

In Fig. 9, the tool and block 52 are shown in full lines in one position of their adjustment and in dotted lines at another position of their adjustment. In this latter position the several parts are primed. The work which is to be cut, when the tool is in its full line position, is shown at 75 in full lines; and its axis is at 76. The work which is to be cut, when the tool is in dotted line position, is denoted at 75'; and its axis is at 76'. Further radial adjustment of the boring tool is, of course, possible by adjustment of the cross slide of the lathe.

In both embodiments of my invention illustrated, it will be noted that the pin 34 or 64 acts to clamp the tool block 22 or 52 between it and the recess 21 or 51 when the securing bolt 30 or bolts 60 are tightened, and that when the bolt or bolts are loosened, the pin acts as a pivot on which the tool block may be swung. It will be understood that the recess 21 or 51 need not be complementary in shape to the bearing surface 24 or 54. It may be V-shaped or of any other suitable contour.

The use of the spring washers 35 or 65 permits accurate adjustment of the tool block 22 or 52 since these washers insure that the block will be held with sufficient firmness during adjustment when the holding bolts are loosened just a little. Adjustment can be made, therefore, rapidly and accurately. By providing an angular adjustment instead of a horizontal adjustment a more rigid holding means is provided. The construction of the tool holder of the present invention enable the operator at any time to make quick changes in tool adjustment, particularly after sharpening of a tool.

While the invention has been described particularly in connection with a holder for boring tools, it will be understood that it may be used, also, for holding turning tools or other forms of lathe tools.

Moreover, while the invention has been described in connection with two different embodiments thereof, it will be understood that it is capable of further modification and this application is intended to cover any variations, uses, or adaptations of the invention following, in general, the principles of the invention and including such departures from the present disclosure as come within known or customary practice in the art to which the invention relates and which may be applied to the essential features hereinbefore set forth and as fall within the scope of the invention or the limits of the appended claims.

Having thus described my invention what I claim is:

1. A tool holder comprising a support, a tool block, a pin on which said block is pivotable for angular adjustment on the support, one of the two first-named parts having a recess therein to receive the other part, said pin extending longitudinally of the recess, and a headed securing bolt extending at an angle to the pin and passing through a hole in the support and threading into the pin, said bolt, when threaded up, being adapted to hold the block in any adjusted position on the support.

2. A tool holder comprising a support, a tool block, a pin on which said block is pivotable for angular adjustment on the support, one of the two first-named parts having a recess therein to receive the other part, said pin extending longitudinally of the recess, a headed securing bolt extending at an angle to the pin and passing through a hole in the support and threading into the pin, said bolt, when threaded up, being adapted to hold the block in any adjusted position on the support, and a spring member interposed between the head of the bolt and the support and adapted when the bolt is slightly released, to exert resilient clamping pressure on the pin to hold the block in position on the support.

3. A tool holder comprising a tool block having a convex bearing surface, a pin mounted in the holder coaxial with said bearing surface, a support on which the block is mounted for angular adjustment about the axis of the pin, said support having a recess therein to receive the convex bearing surface of the block, and a bolt extending at an angle to the pin and passing through the support and through an arcuate slot in the block coaxial with the pin and threading into the pin, said bolt, when threaded up, being adapted to hold the block in any adjusted position on the support.

4. A tool holder comprising a tool block having a convex bearing surface, a pin mounted in the holder coaxial with said bearing surface, a support on which the block is mounted for angular adjustment about the axis of the pin, said support having a concave recess therein complementary to said bearing surface to receive said bearing surface, and a bolt extending at an angle to the pin and passing through the support and through an arcuate slot in the block and threading into the pin, said bolt, when threaded up, being adapted to hold the block in any adjusted position on the support.

5. A tool holder comprising a block having a bearing surface of convex profile shape at one side, a cylindrical pin mounted in the holder to extend longitudinally in the lengthwise direction of said bearing surface, a support on which the block is mounted for angular adjustment about the pin as a pivot, said support having a concave recess therein complementary to said bearing surface to receive said bearing surface, and a bolt extending at right angles to the pin and passing through the support and through an arcuate slot in the block and threading into the pin, said bolt, when threaded up, being adapted to hold the block in any adjusted position on the support.

6. A tool holder comprising a support having a recess therein, a tool block mounted on said support for angular adjustment thereon, said tool block having a bearing surface of convex profile shape adapted to seat in said recess, a cylindrical pin mounted in said block to extend longitudinally in the lengthwise direction of said bearing surface and which is spaced from said bearing surface, a bolt threading at right angles into the pin for securing the pin to the support so that the pin may serve as a pivot for the block in its adjustment, said bolt, when released, permitting adjustment of the block on the support and inversion of the block about the bolt as a pivot, and, when tightened up, serving to secure the block to the support in any adjusted position.

7. A tool holder comprising a support having a longitudinal recess of concave arcuate profile shape in one side thereof, a tool holder mounted on said support for angular adjustment thereon, said tool block having a bearing surface of convex arcuate profile shape at one side thereof adapted to seat in said recess and having a hole extending longitudinally therethrough adjacent its opposite side in which a tool may be mounted, a cylindrical pin mounted in the block between the bearing surface and hole to extend longitudinally parallel to the bearing surface and constitute a pivot for the block, and a bolt for connecting the pin to the support, said bolt threading into the pin at right angles thereto and passing through an arcuate slot in the block, said bolt, when tightened up, serving to secure the block to the support.

8. A tool holder comprising a support having a longitudinal recess of concave arcuate profile shape in one side thereof, a tool block mounted on said support for angular adjustment thereon, said tool block having a bearing surface of convex arcuate profile shape at one side thereof adapted to seat in said recess and having a hole extending longitudinally therethrough adjacent its opposite side in which a tool may be mounted, a cylindrical pin mounted in the block between the bearing surface and hole to extend longitudinally parallel to the bearing surface and constitute a pivot for the block, and a single bolt for connecting the pin to the support, said bolt threading into the pin at right angles thereto at a point midway the length of the block and passing through an arcuate slot in the block, said bolt, when tightened up, serving to secure the block to the support and, when loosened, permitting inversion of the block.

9. A tool holder comprising a support having a longitudinal recess of concave arcuate profile shape in one side thereof, a tool block mounted on said support for angular adjustment thereon, said tool block having a bearing surface of convex arcuate profile shape at one side thereof adapted to seat in said recess and having a hole extending longitudinally therethrough adjacent its opposite side in which a tool may be mounted, a cylindrical pin mounted in the block between the bearing surface and hole to extend longitudinally parallel to the bearing surface and constitute a pivot for the block, a bolt connecting the pin to the support, said bolt threading into the pin at right angles thereto and passing through an arcuate slot in the block, said bolt, when tightened up, serving to secure the block to the support, and a spring member surrounding said bolt and interposed between the head thereof and the support and serving to hold the block resiliently in any adjusted position on the support when the bolt is loosened slightly.

10. A tool holder comprising a support having a longitudinal recess of concave arcuate profile shape in one side thereof, a tool block mounted on said support for angular adjustment thereon, said tool block having a bearing surface of convex arcuate profile shape at one side thereof adapted to seat in said recess and having a hole extending longitudinally therethrough adjacent its opposite side in which a tool may be mounted, a cylindrical pin mounted in the block between the bearing surface and the hole to extend longitudinally parallel to the bearing surface and constitute a pivot for the block, a pair of bolts for connecting the pin to the support, said bolts threading into the pin at right angles thereto and passing through arcuate slots in the block which are coaxial with the pin, said bolts, when tightened up, serving to secure the block to the support, and a third bolt extending through the support at right angles to and between the two first-named bolts and adapted to secure the support to a machine on which the tool is to be used, said support being rotatable about the third bolt when said third bolt is released, to permit rotatable adjustment of the support on the machine.

GEORGE REISINGER.

REFERENCES CITED

The following references are of record in the file of this patent:

UNITED STATES PATENTS

| Number | Name | Date |
|---|---|---|
| 744,725 | Dangerfield | Nov. 24, 1903 |
| 1,052,979 | Slavik | Feb. 11, 1913 |
| 1,131,538 | Mason | Mar. 9, 1915 |

FOREIGN PATENTS

| Number | Country | Date |
|---|---|---|
| 2,748 | Great Britain | Feb. 3, 1913 |